(12) United States Patent
Solanki et al.

(10) Patent No.: US 11,851,038 B2
(45) Date of Patent: Dec. 26, 2023

(54) EMERGENCY ENERGY STORE FOR A VEHICLE

(71) Applicant: Robert Bosch GmbH, Stuttgart (DE)

(72) Inventors: Jitendra Solanki, Singapore (SG); Michael Donotek, Asperg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 433 days.

(21) Appl. No.: 17/045,355

(22) PCT Filed: Jun. 4, 2019

(86) PCT No.: PCT/EP2019/064505
§ 371 (c)(1),
(2) Date: Oct. 5, 2020

(87) PCT Pub. No.: WO2019/238472
PCT Pub. Date: Dec. 19, 2019

(65) Prior Publication Data
US 2021/0146905 A1    May 20, 2021

(30) Foreign Application Priority Data

Jun. 13, 2018   (DE) .......................... 102018209464.0

(51) Int. Cl.
*B60R 16/03*     (2006.01)
*B60T 17/22*     (2006.01)
(Continued)

(52) U.S. Cl.
CPC ............ *B60T 17/22* (2013.01); *B60T 13/662* (2013.01); *B60T 13/745* (2013.01); *B60T 2270/402* (2013.01); *B60T 2270/414* (2013.01)

(58) Field of Classification Search
CPC ......... B60T 2270/402; B60T 2270/414; B60T 13/745; B60T 17/22; B60T 13/662; B60R 16/03; B60R 16/033; B60R 16/04
See application file for complete search history.

(56) References Cited

U.S. PATENT DOCUMENTS 8,116,108 B2 *   2/2012   Becker ................. H02M 7/219
                                                                363/127
2007/0179719 A1 *  8/2007   Dorner .................. H02H 7/122
                                                                702/58
(Continued)

FOREIGN PATENT DOCUMENTS

CN       101879867 A      11/2010
CN       104756386 A       7/2015
(Continued)

OTHER PUBLICATIONS

Machine translation of DE 102016103829, retrieved Feb. 11, 2023 (Year: 2023).*

(Continued)

*Primary Examiner* — Bradley T King
(74) *Attorney, Agent, or Firm* — NORTON ROSE FULBRIGHT US LLP; Gerard Messina

(57) ABSTRACT

An emergency energy store for a vehicle. Multiple electrical energy storage devices may feed electrical power in parallel into an electrical power supply network of a vehicle with the aid of separate voltage converters in each case. An electromechanical brake booster for a vehicle, a braking and/or steering system for a vehicle, and a power supply system for a vehicle, are also provided. A manufacturing method for an emergency energy store of a vehicle is also provided.

9 Claims, 2 Drawing Sheets

(51) Int. Cl.
*B60T 13/66* (2006.01)
*B60T 13/74* (2006.01)

(56) References Cited

U.S. PATENT DOCUMENTS

| | | | |
|---|---|---|---|
| 2010/0176653 A1* | 7/2010 | Arakawa | B60T 13/745 |
| | | | 303/10 |
| 2011/0048874 A1 | 3/2011 | Vollert et al. | |
| 2011/0100735 A1 | 5/2011 | Flett | |
| 2012/0035836 A1* | 2/2012 | Mueller | F02N 11/0866 |
| | | | 701/113 |
| 2016/0315479 A1* | 10/2016 | Ide | B60L 3/003 |
| 2016/0355170 A1* | 12/2016 | Yasui | H02K 7/14 |
| 2017/0120770 A1 | 5/2017 | Huynh et al. | |

FOREIGN PATENT DOCUMENTS

| | | |
|---|---|---|
| DE | 19828331 C1 | 3/2000 |
| DE | 10255429 A1 | 6/2004 |
| DE | 112011105105 T5 | 1/2014 |
| DE | 102016103829 A1 | 9/2017 |
| EP | 2280856 A1 | 2/2011 |
| JP | 2013188090 A | 9/2013 |
| JP | 6274348 B1 | 2/2018 |
| JP | 2019041499 A | 3/2019 |
| WO | 2012163741 A2 | 12/2012 |

OTHER PUBLICATIONS

International Search Report for PCT/EP2019/064505, dated Sep. 20, 2019.

* cited by examiner

EMERGENCY ENERGY STORE FOR A VEHICLE

FIELD

The present invention relates to an emergency energy store for a vehicle. The present invention also relates to an electromechanical brake booster for a vehicle, a braking and/or steering system for a vehicle, and an energy supply system for a vehicle. Furthermore, the present invention relates to a manufacturing method for an emergency energy store of a vehicle.

BACKGROUND INFORMATION

Modern motor vehicles generally have a braking system, which assists the vehicle driver with the aid of a so-called brake booster, so that the vehicle driver alone does not have to exert the full force for actuating the braking system. In addition, motor vehicles may also include diverse further assistance systems, which assist the vehicle driver with the aid of electric drives.

European Patent Application No. EP 2280856 A1 describes an electromechanical brake booster. An auxiliary force is exerted on a piston rod of the braking system with the aid of an electric motor and a worm gear. The electric motor has to be supplied with electrical power to drive the electric motor.

SUMMARY

The present invention provides an emergency energy store for a vehicle, an electromechanical brake booster for a vehicle, a braking and/or steering system for a vehicle, a power supply system for a vehicle, and a manufacturing method for an emergency energy store of a vehicle.

The present invention provides options for providing "emergency power" or reserve energy to a vehicle component of a vehicle even in the event of a failure of an electrical system of the particular vehicle. One particular advantage of the present invention is that in such a situation, a certain amount of emergency power is still providable to the vehicle component even upon the occurrence of an error in a storage cell used for providing power. The present invention thus contributes to increasing a comfort and safety standard of the vehicle equipped with the vehicle component, in that it ensures that a driving characteristics intended by the vehicle may still be effectuated or assisted with the aid of the operation of the vehicle component even in such a rarely occurring emergency situation. This may also be described in that present invention, in addition to a first fallback level in the event of a failure of the vehicle electrical system, creates a so-called (reinforced) second fallback level in the event of a failure of the vehicle electrical system and in the event of a simultaneous occurrence of the error in a storage cell used for providing power.

Further advantages of the present invention are explained hereinafter in the detailed description of its specific embodiments.

In one specific embodiment of the present invention, the multiple electrical energy storage devices each include at least one storage capacitor. The storage capacitors may be, for example, hybrid super capacitors (HSC). In particular, arbitrary suitable arrangements of multiple storage capacitors connected in parallel and/or in series are possible for the particular energy storage devices.

In one specific embodiment of the present invention, the multiple voltage converters each include a step-up converter. In this case, for example, step-up converters are to be understood as DC-DC converters, which convert a DC voltage provided at the input into an output DC voltage, the value of the output DC voltage being higher than the value of the DC voltage provided at the input. In this way, even in the case of varying, in particular decreasing, voltage at the input of such a voltage converter, a suitable, preferably constant, output voltage may be provided. However, it is apparent that depending on the application, other voltage converters, for example, step-down converters or combined step-up/step-down converters (boost/buck converter) may be used. In particular, for example, bidirectional DC-DC converters are also possible. Therefore, for example, the energy storage devices may also be charged with the aid of the voltage converters to a higher voltage level.

In one specific embodiment of the present invention, the multiple voltage converters each include a half-bridge having two semiconductor switch elements connected in series. In addition, the voltage converter may also include further components, for example, inductors, capacitors, etc. A simple and thus cost-effective circuit arrangement for a voltage converter may be implemented by the use of a half-bridge in each case. In particular, multiple half-bridges may be combined to form multiple voltage converters in a simple way. The semiconductor switch elements may include, for example, MOSFETs. In addition, however, other semiconductor switches are also possible in principle, for example, bipolar transistors having an isolated gate terminal (IGE), or similar.

In one specific embodiment of the present invention, the emergency energy store includes two or three voltage converters. Each voltage converter may include a half-bridge of a B6 bridge. In this way, a particularly simple arrangement of multiple voltage converters may be implemented with the aid of a B6 bridge. Such B6 bridges are standard assemblies in the field of energy engineering. They are therefore available in a large variety at relatively low manufacturing costs.

In one specific embodiment of the present invention, each voltage converter of the multiple voltage converters is individually controllable and/or deactivatable. Due to the individual controlling and an individual activation of individual voltage converters, electrical power may be obtained deliberately from the particular connected energy storage devices. In particular, the voltage converters may thus be activated individually in such a way that a constant output voltage at the output of the voltage converter is provided as a function of the charge level of the particular energy storage device. In addition, it is possible in case of an error, for example, to deliberately deactivate one or multiple voltage converters. It may thus be ensured that even in the event of an error in the particular energy storage device and/or the particular voltage converter, such an error does not negatively affect the power supply.

The above-described advantages may also be ensured in an electromechanical brake booster for a vehicle, which may be or is connected upstream from a brake master cylinder of the vehicle and includes such an emergency energy store.

A braking and/or steering system for a vehicle including a corresponding emergency energy store and/or such an electromechanical brake booster also yields the above-explained advantages.

The above-explained advantages may also be effectuated by a power supply system for a vehicle including a vehicle battery and a correspondingly designed emergency energy store.

Furthermore, carrying out a corresponding manufacturing method for an emergency energy store of a vehicle also yields the above-explained advantages. It is to be expressly noted that the manufacturing method may be refined according to the specific embodiments of the emergency energy store.

BRIEF DESCRIPTION OF THE DRAWINGS

Further features and advantages of the present invention are explained hereinafter on the basis of the figures.

DETAILED DESCRIPTION OF EXAMPLE EMBODIMENTS

Figure 1:
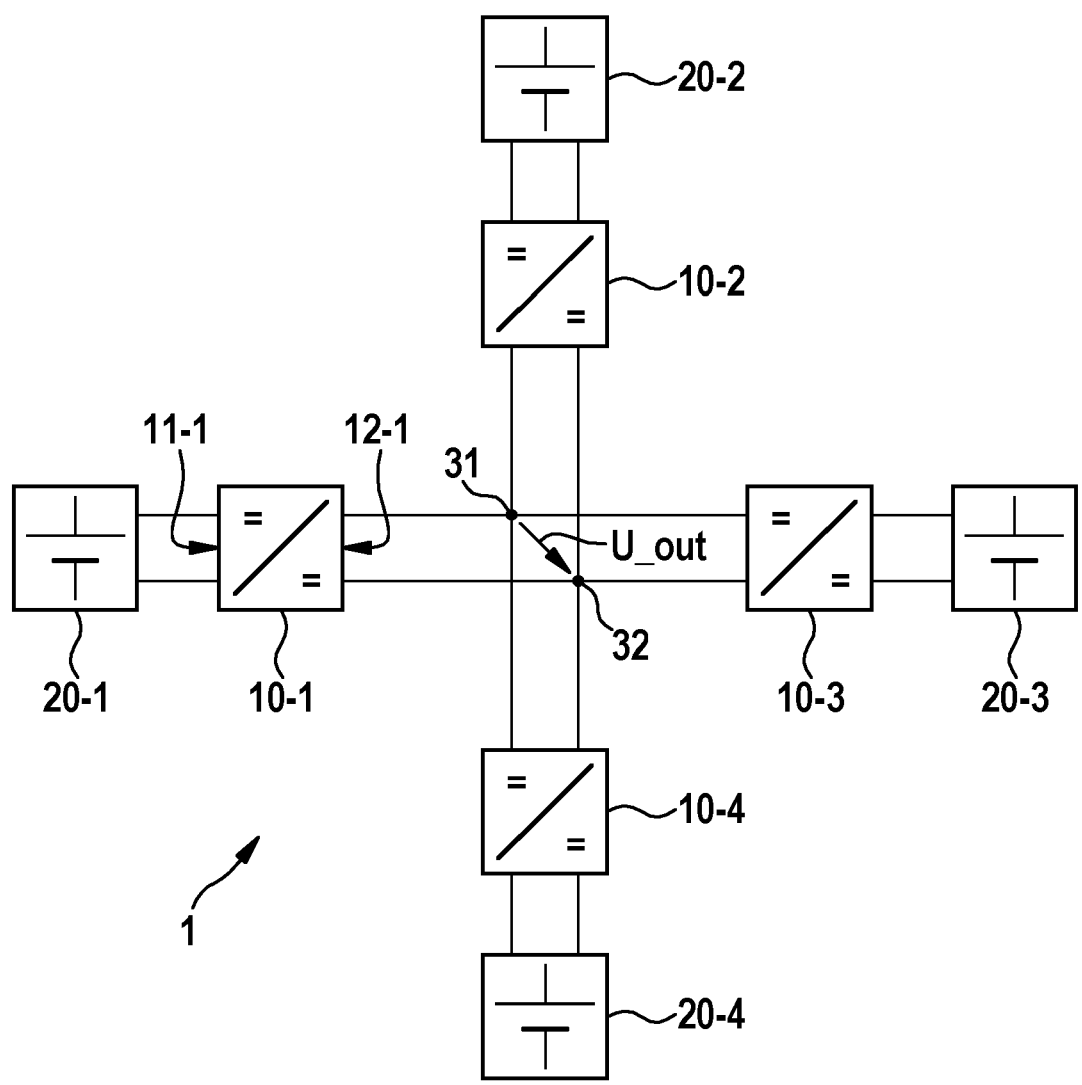
FIG. 1 shows a schematic representation of one specific embodiment of an emergency energy store according to the present invention.

FIG. 1 shows a schematic representation of one specific embodiment of emergency energy store 1 according to the present invention.

Emergency energy store 1 schematically shown in FIG. 1 is usable/installable at and/or in a vehicle/motor vehicle. It is to be expressly noted that a usability of emergency energy store 1 is not restricted to a specific vehicle type/motor vehicle type.

Emergency energy store 1 includes multiple storage cells 20-$i$. Each of storage cells 20-$i$ includes in each case at least one storage capacitor (not shown). If at least one of storage cells 20-$i$ includes multiple storage capacitors, the storage capacitors may alternatively be provided connectedly as a parallel circuit and/or as a series circuit in particular storage cell 20-$i$. The design of emergency energy store 1 shown in FIG. 1 including precisely four storage cells 20-1 through 20-4 is to be interpreted solely as an example and does not represent a restriction of the present invention.

A storage capacitor of storage cells 20-$i$ may be understood, for example, as an electrochemical capacitor, in particular a super capacitor (supercap or SC, for short). For example, at least one hybrid super capacitor (HSC, for short) may be used as a storage capacitor in storage cells 20-$i$. At least one of storage cells 20-$i$ may thus be designed, for example, as a super capacitor cell. A combination of various storage cell types is also possible.

Emergency energy store 1 is designed in such a way that power stored in storage cells 20-$i$ of emergency energy store 1 may still be output as "emergency power" to at least one vehicle component of the particular vehicle/motor vehicle even in the event of a failure of an electrical system of the vehicle/motor vehicle equipped with emergency energy store 1. The vehicle component may thus still be operated at least transitionally with the aid of the output of the "emergency power" in spite of the failure of the vehicle electrical system, and may thus at least transitionally alleviate effects of the failure of the vehicle electrical system. Emergency energy store 1 thus contributes to increasing a comfort and/or safety standard of the particular vehicle/motor vehicle. For example, a component of a braking system and/or a steering system of the vehicle/motor vehicle may still be operated further with the aid of the "emergency power" output by the emergency energy store 1 in spite of the failure of the vehicle electrical system, in such a way that a driver or an autonomous control system may continue to decelerate and/or steer the vehicle/motor vehicle comparatively comfortably and relatively safely. Emergency energy store 1 in this way creates a first (reinforced) fallback level to assist the driver or the autonomous control system when steering and/or decelerating the vehicle/motor vehicle in spite of the failure of the vehicle electrical system.

Emergency energy store 1 of FIG. 1 additionally includes one voltage converter 10-$i$ per storage cell 20-$i$ of emergency energy store 1, each of storage cells 20-$i$ being connected to its (specially) associated voltage converter 10-$i$. Emergency energy store 1 thus includes, for example, as many voltage converters 10-$i$ as storage cells 20-$i$. A storage cell total number of storage cells 20-$i$ of emergency energy store 1 is preferably equal to a voltage converter total number of voltage converters 10-$i$ of emergency energy store 1.

Due to an association of an individual voltage converter 10-$i$ with each of storage cells 20-$i$ of emergency energy store 1, each of storage cells 20-$i$ of emergency energy store 1 may be discharged independently of other storage cells 20-$i$ of emergency energy store 1. Therefore, an error existing at one of storage cells 20-$i$ of emergency energy store 1 may also be bypassed in that at least one of still functional storage cells 20-$i$ is discharged independently of defective storage cell or cells 20-$i$. The output of the "emergency power" to the particular vehicle component is thus still possible in the event of a failure of an electrical system of the particular vehicle/motor vehicle in spite of the error existing at one of storage cells 20-$i$ of emergency energy store 1. Emergency energy store 1 of FIG. 1 thus has an increased redundancy in relation to conventional systems, which contributes to additionally increasing the comfort and safety standard of the particular vehicle/motor vehicle. Emergency energy store 1 therefore not only effectuates the first (reinforced) fallback level in the event of a failure of the vehicle electrical system, but also implements a second fallback level upon the presence of an error in one of its storage cells 20-$i$, in which the driver or the autonomous control system is also assisted with the aid of the "emergency power," which may still be output, when steering and/or decelerating the vehicle/motor vehicle. A "double error situation" due to the failure of the vehicle electrical system and the error present at one of storage cells 20-$i$ may thus still at least be alleviated in its effects with the aid of the high level of redundancy of emergency energy store 1.

Voltage converters 10-$i$ may each also be referred to as a DC-DC voltage converter, DC-DC converter, or as a converter. As is apparent in FIG. 1, voltage converters 10-$i$ of emergency energy store 1 are connected in parallel to one another. An output voltage U_out may thus be tapped at contacts 31 and 32 of emergency energy store 1, which corresponds to the output voltage at terminals 12-$i$ of voltage converters 10-$i$ connected in parallel. In particular, respective active voltage converters 10-$i$ connected in parallel are activated in such a way that they each provide an equal or at least approximately equal output voltage between the two contacts 31 and 32. It is possible by individually activating particular active voltage converters 10-$i$, even with different charge levels of particular connected storage cells 20-$i$ and/or particular different input voltages at terminals 11-$i$ of voltage converters 10-$i$, for all voltage converters 10-$i$ to provide an equally high output voltage between contacts 31 and 32.

Since each of storage cells 20-$i$ may be individually controlled and in particular also activated with the aid of voltage converter 10-$i$ associated with it, it is additionally also possible to deactivate the particular branch both upon the occurrence of an error in a voltage converter 10-*i* or connected storage cell 20-*i*, and in the event of a deep discharge (high depth of discharge, DoD) of particular storage cell 20-*i*.

Figure 2:
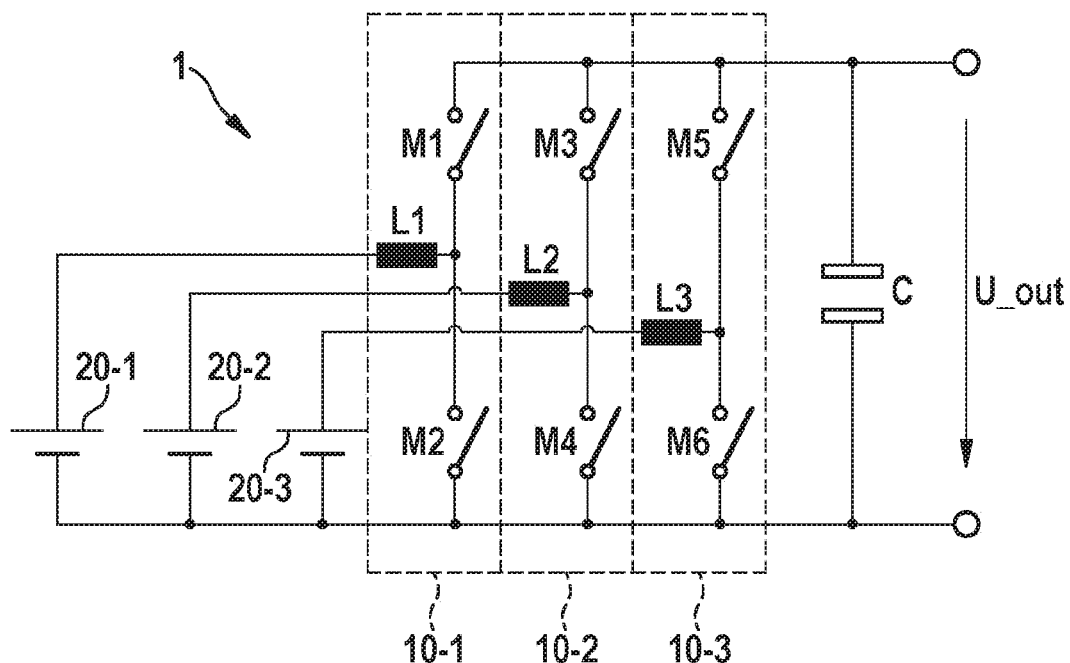
FIG. 2 shows a schematic representation of a schematic circuit diagram of one specific embodiment of the emergency energy store according to the present invention.

FIG. 2 shows a schematic representation of a schematic circuit diagram of an emergency energy store 1 according to one specific embodiment. The specific embodiment shown here including three storage cells 20-1, 20-2, and 20-3 is also only used for understanding and does not represent a restriction of the present invention. Each of voltage converters 10-*i* is formed by a half-bridge made up of two semiconductor switches connected in series and an inductor. A first voltage converter 10-1 is formed by the two semiconductor switches M1 and M2 connected in series.

A first node point, at which the two semiconductor switches M1 and M2 are connected to one another, is connected via a first inductor L1 to a terminal of first storage cell 20-1. Similarly, a second node point, at which the two semiconductor switches M3 and M4 are connected to one another, is connected via a second inductor L2 to a terminal of second storage cell 20-2. A third node point, at which the two semiconductor switches M5 and M6 are connected to one another, is also connected via a third inductor L3 to a terminal of third storage cell 20-3. The particular other terminals of storage cells 20-1, and the lower terminals of lower switch elements M2, M4, and M6 of the half-bridges are connected to a terminal element of the output terminal, which corresponds, for example, to above-described contact 32. Upper semiconductor switches M1, M3, and M5 are connected at the particular terminals not connected to the node points to a further terminal element of the output terminal, which corresponds, for example, to above-described contact 31. Switch elements M1 through M6 of voltage converters 10-*i* may be designed, for example, as MOSFETs. A capacitance C made up of one or multiple capacitors connected in parallel may be situated between the two terminal elements of the output terminal.

If emergency energy store 1, as shown in FIG. 2, includes at most three voltage converters 10-*i*, emergency energy store 1 may include a B6 gate driver, with the aid of which the at most six switch elements M1 through M6 of voltage converters 10-1 through 10-3 are switchable. A frequently used gate driver part may thus be used for manufacturing emergency energy store 1. This simplifies the manufacturing of emergency energy store 1 and contributes to reducing its manufacturing costs.

With the aid of above-described emergency energy store 1, for example, a brake pressure buildup device of the particular vehicle/motor vehicle, such as an iBooster, and/or a brake pressure modulation unit of the particular vehicle/motor vehicle, such as an ESP, may still be at least transitionally operated in spite of a failure of its vehicle electrical system. Emergency energy store 1 may therefore advantageously be integrated at and/or into a braking system. The brake pressure buildup device may be, for example, an electromechanical brake booster, which is connectable/connected upstream of a brake master cylinder of the vehicle in such a way that a pressure may be increased/is increased in the brake master cylinder and in a wheel brake cylinder connected thereto with the aid of the operation of the electromechanical brake booster effectuated by the output voltage. In the specific embodiment of FIG. 2, emergency energy store 1 includes three storage cells 20-*i* by way of example. The three storage cells 20-*i* are sufficient to ensure at least temporary operation of the electromechanical brake booster even upon a failure of the electrical system of the vehicle/motor vehicle. The vehicle/motor vehicle may thus still be decelerated reliably with the aid of output voltage U_out even in such a situation, alternatively autonomous deceleration or driver-assisting deceleration being possible.

In particular, emergency energy store 1 schematically shown in FIGS. 1 and 2 may be installed at and/or in the electromechanical brake booster. A conventional electromechanical brake booster generally includes six MOSFETs as switch elements. If emergency energy store 1 includes at most three voltage converters 10-*i*, the electromechanical brake booster may therefore also include a B12 gate driver, with the aid of which the at most six switch elements M1 through M6 of emergency energy store 1 and the six further switch elements of the electronics of the electromechanical brake booster external to the emergency energy store are switchable.

In addition, emergency energy store 1 (possibly in addition to the electromechanical brake booster) may also still operate another brake pressure buildup component for a transition time after failure of the electrical system of the vehicle/motor vehicle. For example, emergency energy store 1 may operate a motor component of a steering unit/a steering system with the aid of the output voltage after failure of the vehicle electrical system. If emergency energy store 1 is also used for steering, it is possible to increase the number of its storage cells 20-*i* to four storage cells. Emergency energy store 1 may therefore also advantageously be integrated at and/or into a steering unit for a vehicle, or a braking and steering system for a vehicle. A power supply system for a vehicle including a vehicle battery and emergency energy store 1 is also advantageous.

Figure 3:
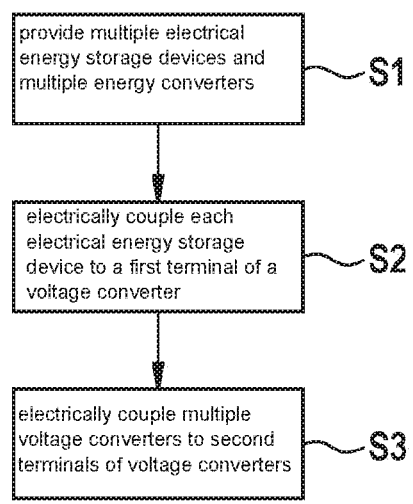
FIG. 3 shows a flowchart to explain one specific embodiment of a manufacturing method for an emergency energy store of a vehicle.

FIG. 3 shows a flowchart to explain one specific embodiment of the manufacturing method for an emergency energy store 1 of a vehicle.

For example, above-explained emergency energy store 1 may be manufactured with the aid of the manufacturing method described hereinafter. However, a feasibility of the manufacturing method is not limited to this emergency energy store 1.

In a method step S1, multiple electrical energy storage devices 20-*i* and multiple voltage converters 10-*i* are provided. In a further method step S2, electrical coupling of one electrical energy storage device 20-*i* to a first terminal 11-*i* of a voltage converter 10-*i* takes place in each case, and in a method step S3, electrical coupling of multiple voltage converters 10-*i* to second terminals 12-*i* of voltage converters 10-*i* takes place. Method steps S2 and S3 may be carried out in any arbitrary sequence, simultaneously, or overlapping in time.

In summary, the present invention relates to an emergency energy store for a vehicle, in which multiple electrical energy storage devices may each feed electrical power in parallel into an electrical power supply network of a vehicle with the aid of separate voltage converters. The present invention also relates to an electromechanical brake booster for a vehicle, a braking and/or steering system for vehicle, and a power supply system for a vehicle. Furthermore, the present invention relates to a manufacturing method for an emergency energy store of a vehicle.

What is claimed is:
1. An emergency energy store for a vehicle, comprising:
multiple electrical energy storage devices; and
multiple voltage converters, which each include a first terminal and a second terminal;
wherein each of the voltage converters is coupled at a first terminal to a respective one of the electrical energy storage devices; and wherein each of the multiple voltage converters is electrically coupled to one another at the second terminals, wherein each of the multiple voltage converters includes a half-bridge including two semiconductor switch elements connected in series.

2. The emergency energy store as recited in claim 1, wherein each of the multiple electrical energy storage devices includes at least one storage capacitor.

3. The emergency energy store as recited in claim 1, wherein each of the multiple voltage converters includes a step-up converter.

4. The emergency energy store as recited in claim 1, wherein the emergency energy store includes two or three voltage converters, each of the two or three voltage converters encompassing a half-bridge including a B6 bridge.

5. The emergency energy store as recited in claim 1, wherein each voltage converter of the multiple voltage converters is individually controllable and/or activatable.

6. An electromechanical brake booster for a vehicle, which is connectable or connected upstream from a brake master cylinder of the vehicle, the electromechanical brake booster including an emergency energy store comprising multiple electrical energy storage devices, and multiple voltage converters, which each include a first terminal and a second terminal, wherein each of the voltage converters is coupled at a first terminal to a respective one of the electrical energy storage devices, wherein each of the multiple voltage converters is electrically coupled to one another at the second terminals, and wherein each of the multiple voltage converters includes a half-bridge including two semiconductor switch elements connected in series.

7. A braking and/or steering system for a vehicle, comprising:
an emergency energy store including multiple electrical energy storage devices, and multiple voltage converters, which each include a first terminal and a second terminal, wherein each of the voltage converters is coupled at a first terminal to a respective one of the electrical energy storage devices, wherein each of the multiple voltage converters is electrically coupled to one another at the second terminals, and wherein each of the multiple voltage converters includes a half-bridge including two semiconductor switch elements connected in series.

8. A power supply system for a vehicle, comprising:
a vehicle battery; and
an emergency energy store including multiple electrical energy storage devices, and multiple voltage converters, which each include a first terminal and a second terminal, wherein each of the voltage converters is coupled at a first terminal to a respective one of the electrical energy storage devices, wherein each of the multiple voltage converters is electrically coupled to one another at the second terminals, and wherein each of the multiple voltage converters includes a half-bridge including two semiconductor switch elements connected in series.

9. A method for manufacturing an emergency energy store of a vehicle, comprising the following steps:
providing multiple electrical energy storage devices and multiple voltage converters;
electrically coupling each of the electrical energy storage devices to a first terminal of a respective one of the voltage converters; and
electrically coupling the multiple voltage converters to second terminals of the multiple voltage converters, wherein each of the multiple voltage converters includes a half-bridge including two semiconductor switch elements connected in series.

* * * * *